United States Patent
Chernoguzov et al.

(10) Patent No.: US 9,503,478 B2
(45) Date of Patent: Nov. 22, 2016

(54) POLICY-BASED SECURE COMMUNICATION WITH AUTOMATIC KEY MANAGEMENT FOR INDUSTRIAL CONTROL AND AUTOMATION SYSTEMS

(71) Applicant: Honeywell International Inc., Morristown, NJ (US)

(72) Inventors: Alexander Chernoguzov, Warrington, PA (US); Thomas R. Markham, Fridley, MN (US); Harshal S. Haridas, Jamison, PA (US)

(73) Assignee: Honeywell International Inc., Morris Plains, NJ (US)

( * ) Notice: Subject to any disclaimer, the term of this patent is extended or adjusted under 35 U.S.C. 154(b) by 82 days.

(21) Appl. No.: 14/309,251

(22) Filed: Jun. 19, 2014

(65) Prior Publication Data

US 2015/0215339 A1    Jul. 30, 2015

Related U.S. Application Data

(60) Provisional application No. 61/932,142, filed on Jan. 27, 2014.

(51) Int. Cl.
*H04L 29/06* (2006.01)
*G05B 15/02* (2006.01)
*G05B 19/042* (2006.01)
(Continued)

(52) U.S. Cl.
CPC .............. *H04L 63/20* (2013.01); *H04L 63/06* (2013.01); *H04L 63/062* (2013.01); *H04L 63/08* (2013.01); *H04L 63/10* (2013.01); *H04L 63/105* (2013.01); *G05B 15/02* (2013.01); *G05B 19/0428* (2013.01); *G05B 19/4185* (2013.01);
(Continued)

(58) Field of Classification Search
CPC ..... H04L 63/20; H04L 63/10; H04L 63/083; H04L 63/06; H04L 63/062; H04L 63/08; H04L 63/101; H04L 63/104; H04L 63/105; H04L 67/12; G05B 15/02; G05B 19/0428; G05B 19/4185

See application file for complete search history.

(56) References Cited

U.S. PATENT DOCUMENTS 6,243,695 B1 * 6/2001 Assaleh .................. G06K 9/68
706/20
6,990,379 B2 * 1/2006 Gonzales ............ H04L 12/2803
340/3.1

(Continued)

OTHER PUBLICATIONS

Extended European Search Report dated Jun. 15, 2015 in connection with European Patent Application No. 14192912.5; 7 pages.

(Continued)

*Primary Examiner* — Jung Kim
*Assistant Examiner* — James J Wilcox

(57) ABSTRACT

A method includes generating at least one access vector associated with a specified device in an industrial process control and automation system. The specified device has one of multiple device roles. The at least one access vector is generated based on one or more communication policies defining communications between one or more pairs of devices roles in the industrial process control and automation system, where each pair of device roles includes the device role of the specified device. The method also includes providing the at least one access vector to at least one of the specified device and one or more other devices in the industrial process control and automation system in order to control communications to or from the specified device.

20 Claims, 9 Drawing Sheets

(51) Int. Cl.
*G05B 19/418* (2006.01)
*H04L 29/08* (2006.01)

(52) U.S. Cl.
CPC ............ *H04L63/101* (2013.01); *H04L 63/104* (2013.01); *H04L 67/12* (2013.01)

(56) References Cited

U.S. PATENT DOCUMENTS

| | | | |
|---|---|---|---|
| 7,657,946 B2* | 2/2010 | Yan | G06F 21/6218 726/28 |
| 8,381,306 B2 | 2/2013 | McPherson et al. | |
| 8,429,435 B1* | 4/2013 | Clayton | H04L 12/10 700/19 |
| 9,043,861 B2* | 5/2015 | Lang | H04L 63/0263 726/1 |
| 9,218,502 B1* | 12/2015 | Doermann | G06F 21/6218 |
| 2004/0015262 A1 | 1/2004 | Brown et al. | |
| 2004/0153171 A1 | 8/2004 | Brandt et al. | |
| 2005/0251680 A1* | 11/2005 | Brown | H04L 63/061 713/171 |
| 2007/0180491 A1* | 8/2007 | Mevissen | H04L 63/10 726/2 |
| 2007/0283443 A1 | 12/2007 | McPherson et al. | |
| 2010/0050267 A1* | 2/2010 | Nochta | G06F 21/6236 726/27 |
| 2012/0117380 A1 | 5/2012 | Herberth et al. | |
| 2013/0198799 A1* | 8/2013 | Staggs | H04L 63/105 726/1 |
| 2015/0082377 A1* | 3/2015 | Chari | H04L 63/20 726/1 |
| 2015/0244742 A1* | 8/2015 | Reynolds | H04L 63/061 726/1 |
| 2015/0378328 A1* | 12/2015 | Gustin | G05B 13/04 700/9 |

OTHER PUBLICATIONS

"IPsec"; IPsec-Wikipedia, the free encyclopedia; http://en.wikipedia.org/wiki/IPsec; printed Jun. 2014; pp. 1-10.

* cited by examiner

POLICY-BASED SECURE COMMUNICATION WITH AUTOMATIC KEY MANAGEMENT FOR INDUSTRIAL CONTROL AND AUTOMATION SYSTEMS

CROSS-REFERENCE TO RELATED APPLICATION AND PRIORITY CLAIM

This application claims priority under 35 U.S.C. §119(e) to U.S. Provisional Patent Application No. 61/932,142 filed on Jan. 27, 2014. This provisional patent application is hereby incorporated by reference in its entirety.

GOVERNMENT LICENSE RIGHTS

This invention was made with government support under Contract No. DE-OE0000544 awarded by the U.S. Department of Energy. The government has certain rights in the invention.

TECHNICAL FIELD

This disclosure relates generally to industrial process control and automation systems. More specifically, this disclosure relates to policy-based secure communication with automatic key management for industrial control and automation systems.

BACKGROUND

Industrial process control and automation systems are often used to automate large and complex industrial processes. These types of systems routinely include sensors, actuators, and controllers. The controllers typically receive measurements from the sensors and generate control signals for the actuators.

Industrial process control and automation systems have evolved from using obscure proprietary technologies to using commercial off-the-shelf (COTS) networking components and equipment. Unfortunately, the use of COTS technology has brought many security challenges with it that have not been addressed in the normal evolution process of the control and automation systems. As a result, industrial process control and automation systems may be vulnerable to illicit access and use, such as by hackers who may gain access to communication networks used in distributed control systems.

SUMMARY

This disclosure provides policy-based secure communication with automatic key management for industrial control and automation systems.

In a first embodiment, a method includes generating at least one access vector associated with a specified device in an industrial process control and automation system. The specified device has one of multiple device roles. The at least one access vector is generated based on one or more communication policies defining communications between one or more pairs of devices roles in the industrial process control and automation system, where each pair of device roles includes the device role of the specified device. The method also includes providing the at least one access vector to at least one of the specified device and one or more other devices in the industrial process control and automation system in order to control communications to or from the specified device.

In a second embodiment, an apparatus includes at least one processing device configured to generate at least one access vector associated with a specified device in an industrial process control and automation system that has one of multiple device roles. The at least one access vector is based on one or more communication policies defining communications between one or more pairs of devices roles in the industrial process control and automation system, where each pair of device roles includes the device role of the specified device. The apparatus also includes an interface configured to provide the at least one access vector to at least one of the specified device and one or more other devices in the industrial process control and automation system in order to control communications to or from the specified device.

In a third embodiment, a non-transitory computer readable medium embodies a computer program. The computer program includes computer readable program code for generating at least one access vector associated with a specified device in an industrial process control and automation system that has one of multiple device roles. The at least one access vector is generated based on one or more communication policies defining communications between one or more pairs of devices roles in the industrial process control and automation system, where each pair of device roles includes the device role of the specified device. The computer program also includes computer readable program code for providing the at least one access vector to at least one of the specified device and one or more other devices in the industrial process control and automation system in order to control communications to or from the specified device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
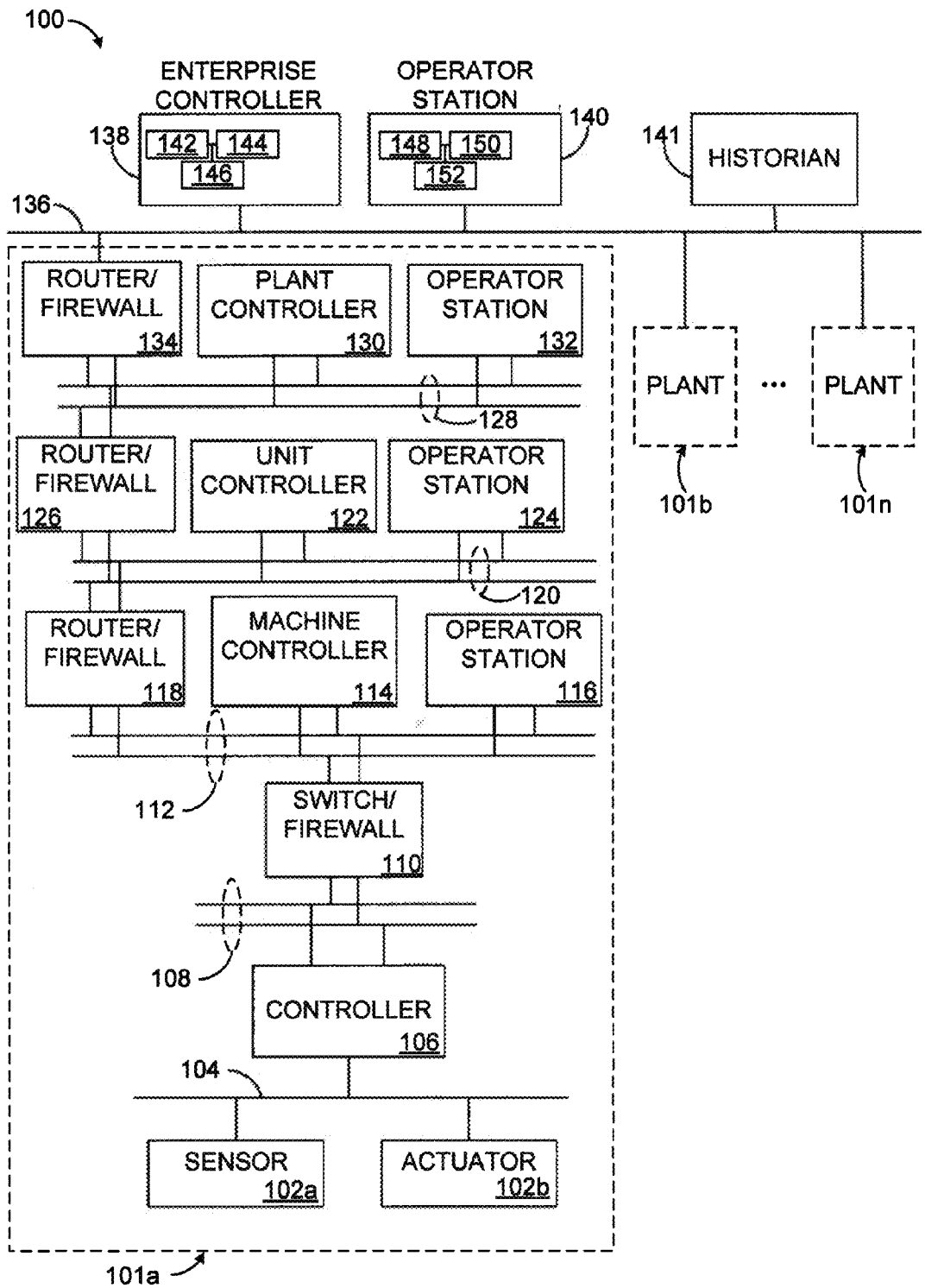
FIGS. 1 and 2 illustrate an example industrial process control and automation system and related details according to this disclosure.
Figure 2:
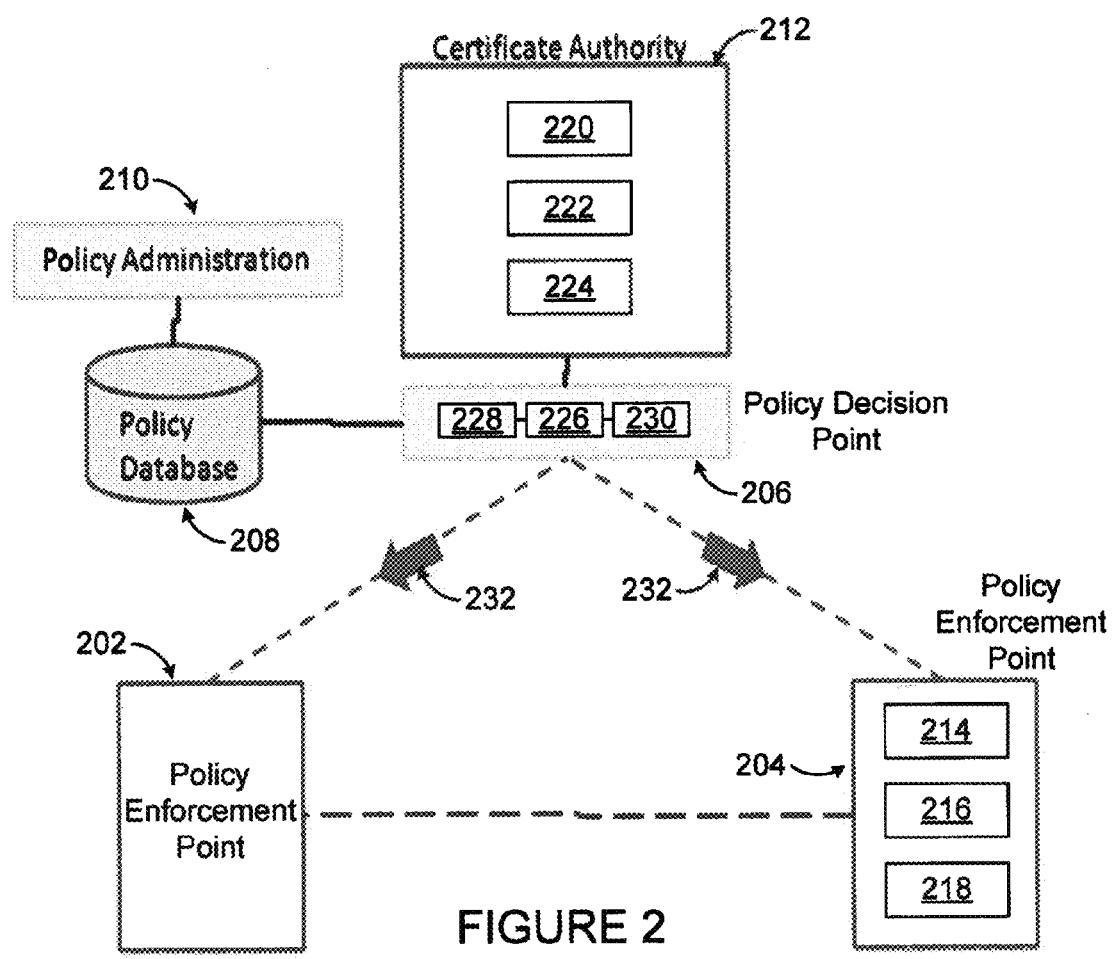
Figure 3:
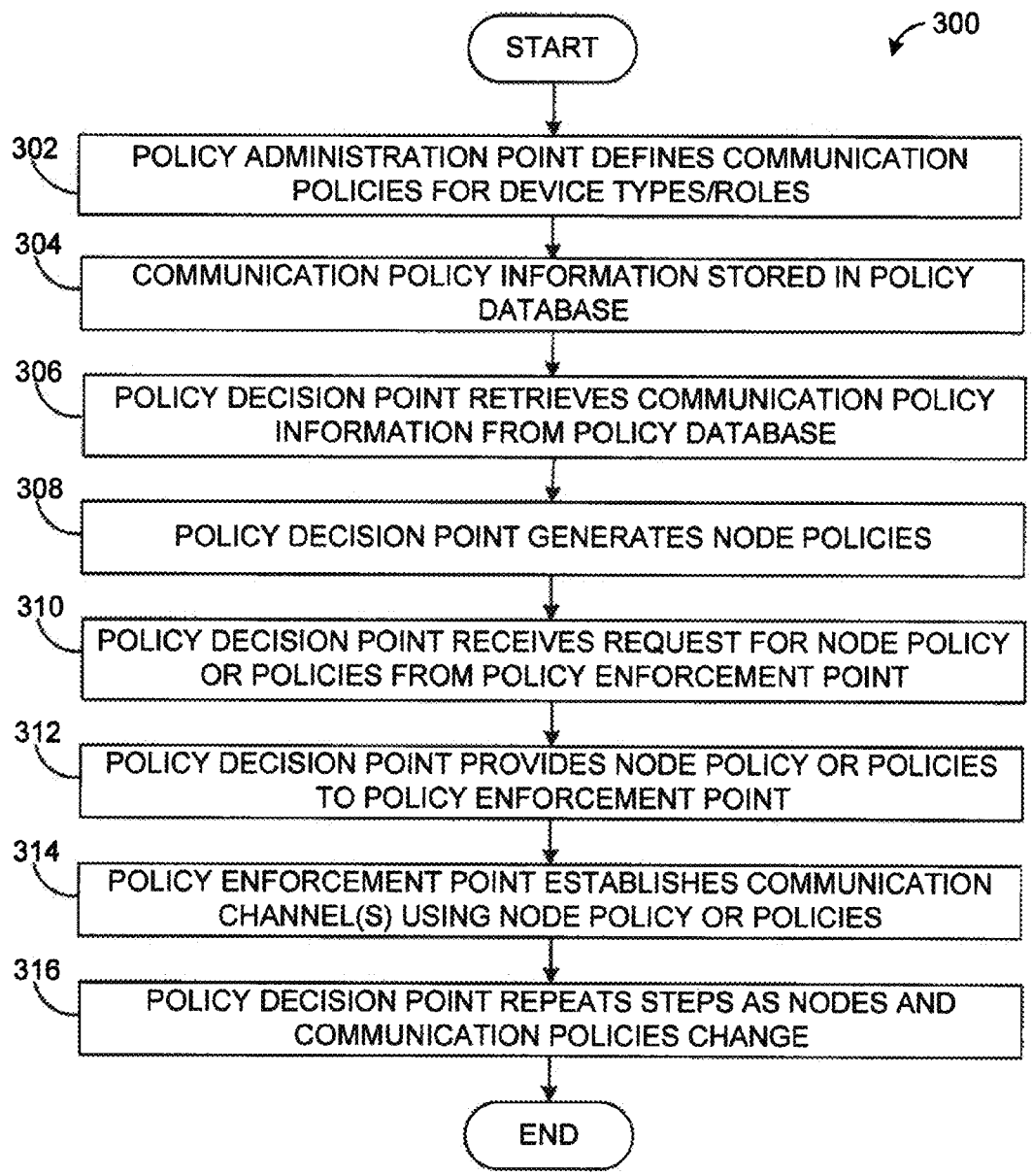
FIGS. 3 through 8 illustrate an example method for policy-based secure communication with automatic key management in an industrial process control and automation system and related details according to this disclosure.

FIGS. 1 and 2 illustrate an example industrial process control and automation system 100 and related details according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FIE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FIE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As described above, conventional industrial process control and automation systems are often vulnerable to illicit access and use. In various embodiments, this disclosure employs authentication, encryption, and key management techniques to provide policy-based secure communication capabilities to industrial control and automation systems, such as those that support standard Ethernet networking.

This functionality can be implemented in any of the nodes shown in FIG. 1, such as in any of the controllers or operator stations of FIG. 1.

Among other things, the authentication, encryption, and key management techniques disclosed in this patent document support one, some, or all of the following features.

- A communication policy can be constructed based on a device's type/role and its location in the Purdue model. A broad policy can be constructed automatically based on a device classification with little or no user intervention. In addition to a broad device type-based policy, specific point-to-point communication policies between devices can also be allowed for fine-grain policy specifications.
- One or more access vectors specific to each device can be generated. An access vector can encode a subset of an overall communication policy specific to a device. An access vector can be expressed in a device- and technology-independent manner. When a device receives an access vector, the device can translate the access vector into a device- and communication technology-specific representation, such as into an Internet Protocol Security (IPsec) configuration for a Linux or other operating system.
- Policies can be pushed and cached in one or more devices. The caching can be done to reduce reliance on a policy server, thus increasing network robustness against failures. For example, if a policy server fails, the network can continue to operate with the last-known policy for each device. Policies can be pushed to avoid synchronization issues. For instance, a policy server can maintain a list of devices to which each policy is successfully delivered, reducing the potential for inconsistent policies across devices.
- Devices joining a secure network can obtain certificates from a certificate authority. Various standards exist for obtaining certificates, such as the Certificate Management Protocol (CMP). This disclosure provides various mechanisms for protecting (such as by encrypting and authenticating) an initial certificate signing request. For example, various techniques are proposed below to cover industrial equipment with different capabilities.
- The certificate authority could store various data, such as its private key, on a removable smart card or other portable device. The portable device could be removed from the certificate authority when needed or desired and locked in a secure location.

Details of some of these functions are shown in FIG. 2, where communications between two policy enforcement points (PEPs) 202-204 can be protected as described below. Also shown in FIG. 2 are a policy decision point (PDP) 206, a policy database 208, a policy administration point 210, and a certificate authority (CA) 212.

The PEPs 202-204 represent end devices that communicate with one another via a secure protocol, such as IPsec. The PEPs 202-204 could represent any suitable devices in a control system, such as any of the controllers or operator stations shown in FIG. 1. Example types of PEPs include WINDOWS machines, bump in the wire (BITW) devices, and industrial process controllers (such as HONEYWELL C300 controllers). The PEPs 202-204 generally enforce device-level access control, which is why these devices are referred to as policy enforcement points.

In some embodiments, each PEP 202-204 includes or supports a negotiation module 214, a key store 216, and a security protocol engine 218. The negotiation module 214 supports the Internet Key Exchange (IKE) version 1, IKE version 2, or other standard to negotiate between a pair of devices in order to establish an IPsec or other security association. Note that while the example here uses IKE and IPsec, policy-based key management may be used with other protocols, such as Transport Layer Security (TLS) or Secure Sockets Layer (SSL) protocols.

The key store 216 stores security credentials, such as a private key for the PEP itself and session keys used within IPsec. The security protocol engine 218 implements the secure protocol used by the PEPs 202-204, such as IPsec. In some embodiments, the security protocol engine 218 supports Encapsulating Security Payload (ESP) as specified in RFC4301 and RFC4309. In particular embodiments, ESP can be used exclusively, and an authentication header (AH) need not be supported. Also, in particular embodiments, the algorithms used within IKE and IPsec can be based on NSA suite B, which is specified in RFC6379. These could include ECDSA P-256 signatures for X.509 certificates, SHA-256 message authentication, AES-CBC 128-bit encryption for IKE, elliptic curve Diffie Hellman (ECDH) P-256 for key exchange, and AES-GCM 128-bit for IPsec (which can include message authentication with null encryption and message authentication with encryption).

The PDP 206 operates to approve devices (including the PEPs 202-204) requesting to join a network, extract policy information from the policy database 208, and create access vectors that are distributed to the devices. The PDP 206 may also be referred to as a security manager. The policy database 208 stores policy information, such as device identifiers, device role memberships, and rules for how device roles may communicate. Any suitable database technology could be used, such as an SQL database. The policy administration point 210 provides a user interface for the specification of the policies. In some embodiments, policy administration is implemented at the policy administration point 210 using an application executed by a WINDOWS machine or other computing device.

The CA 212 is responsible for managing cryptographic or security keys in the system 100. In some embodiments, key management is based upon a public key infrastructure (PKI) and the X.509 v3 certificate model, where the CA 212 can sign X.509 certificates for devices (including the PEPs 202-204) joining the network. In the example shown in FIG. 2, the CA 212 includes or supports a human machine interface 220, business logic 222, and a key store 224. The human machine interface 220 allows an administrator or other user to initialize the CA 212 (possibly including commanding a smart card or other device to provide a CA public/private key pair) and configure the CA 212 to interoperate with each PDP 206. The business logic 222 represents the logic used to prepare and sign digital certificates and to support certificate revocation. The key store 224 stores the CA root private key in order to protect the confidentiality of that key.

In some embodiments, the CA 212 can be implemented on a WINDOWS machine since WINDOWS provides an abstraction for key storage and signing through CRYPTOGRAPHIC SERVICE PROVIDER (CSP) technology. In particular embodiments, such as in a high-security implementation, the CA's private key could be stored in a smart card or other secure device, and certificate signing requests can be passed into the smart card so that the private key never leaves the smart card. Other embodiments can use MICROSOFT's SOFTWARE CRYPTO PROVIDER in conjunction with a Trusted Platform Module (TPM), which allows for strong key protection since the key resides in the TPM but does not offer an easy offline ability of a removable smart card. Still other embodiments can use CSP with key storage in a file system or MICROSOFT's CRYPTOGRAPHY NEXT GENERATION (CNG) key storage available in WINDOWS SERVER 2008. Moreover, in particular embodiments, the X.509 v3 certificates can be used as specified in RFC5280.

Each of the components shown in FIG. 2 could be implemented in any suitable manner, such as by using hardware only or a combination of hardware and software/firmware instructions. For example, the PDP 206 could be implemented using one or more processing devices 226, one or more memories 228, and at least one network interface 230. The policy administration point 210 and the CA 212 could be implemented in the same or similar manner. Also, the components shown in FIG. 2 could be used in any suitable level of an industrial process control and automation system. In particular embodiments, the components shown in FIG. 2 are implemented in higher levels of the system 100, such as at Level 3 or above. Moreover, in particular embodiments, the components shown in FIG. 2 can be designed to re-use existing standards and technologies whenever practical in order to lower barriers for adoption.

As described in more detail below, the PDP 206 provides access vectors 232 to the PEPs 202-204. The access vector 232 for a specific device identifies the way that the device is to interact with other devices. In some embodiments, there could be one of four options defined in an access vector 232: (1) no communications, (2) plaintext/cleartext communications, (3) integrity/authentication only, or (4) encryption/confidentiality and integrity/authentication. Each access vector 232 can be tailored to its target device, such as when the access vector for a WINDOWS 2007 workstation is different from the access vector for a BITW device. Additional details regarding the use of access vectors 232 are provided below.

Although FIGS. 1 and 2 illustrate one example of an industrial process control and automation system 100 and related details, various changes may be made to FIGS. 1 and 2. For example, a control and automation system could include any number of sensors, actuators, controllers, operator stations, networks, PEPs, PDPs, policy databases, policy administration points, and CAs. Also, the makeup and arrangement of the system 100 in FIGS. 1 and 2 are for illustration only. Components could be added, omitted, combined, or placed in any other suitable configuration according to particular needs. As a particular example, two or more of the components 206-212 could be combined into a single functional unit. Further, particular functions have been described as being performed by particular components of the system 100. This is for illustration only. In general, process control and automation systems are highly configurable and can be configured in any suitable manner according to particular needs. In addition, FIGS. 1 and 2 illustrate an example environment in which policy-based secure communication with automatic key management can be used. This functionality can be used in any other suitable device or system.

FIGS. 3 through 8 illustrate an example method 300 for policy-based secure communication with automatic key management in an industrial process control and automation system and related details according to this disclosure. For ease of explanation, the method 300 and related details shown in FIGS. 3 through 8 are described with respect to the components 202-212 of FIG. 2 operating in the system 100 of FIG. 1. However, the method 300 and related details could be used with any other suitable components and in any suitable system.

A policy administration point defines communication policies for different device types or device roles at step 302. This could include, for example, the policy administration point 210 presenting a user interface to an administrator or other user and receiving definitions of communication policies from the user. In some embodiments, the user can define communication policies for various pairs of device types or device roles in the system. Communication policy information is stored in a policy database at step 304. This could include, for example, the policy administration point 210 storing information identifying the user-defined communication policies in the policy database 208.

Figure 4:
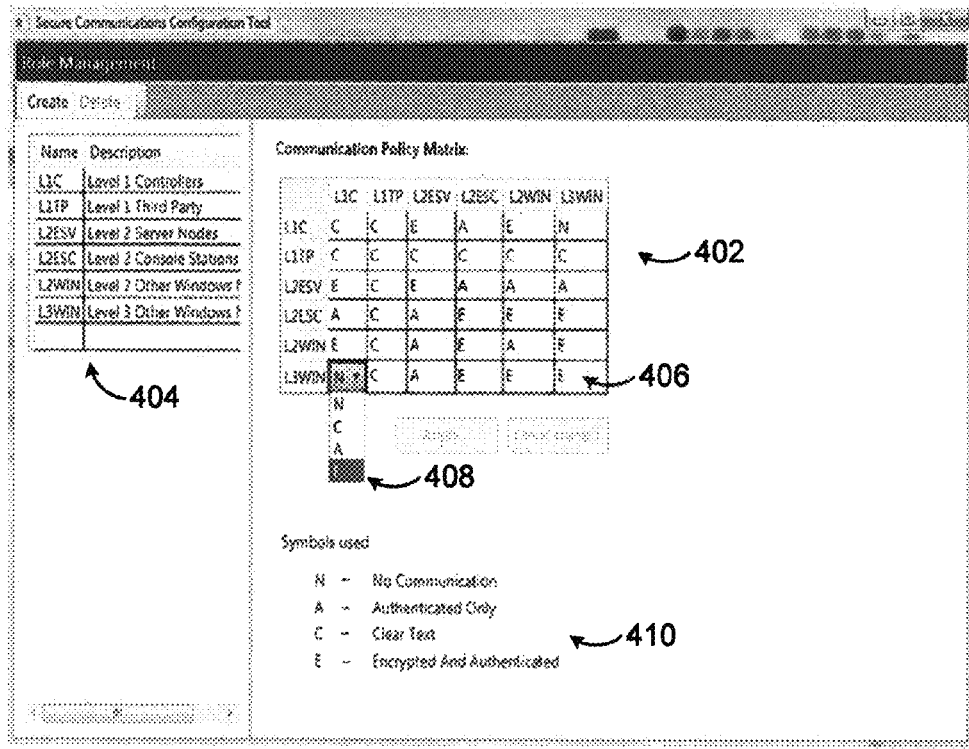

An example of this is shown in FIG. 4, which illustrates an example interface 400 for secure communication policy administration according to this disclosure. The interface 400 could, for example, be provided by the policy administration point 210 and used to define and control the communication policies identified in the policy database 208. In particular embodiments, the policy administration point 210 could execute a policy configuration engine, such as an application running on a WINDOWS computing device.

Devices registered in the system (such as the PEPs 202-204 or other devices holding X.509 certificates signed by the CA 212) can be assigned to device roles. Typical device roles could include control servers, operator workstations, controllers, BITW devices, and engineering workstations. Finer-granularity roles, such as those defined by a local site administrator, can also be supported. The interface 400 can be used to define the communication policies for communications involving those device roles.

As shown in FIG. 4, the interface 400 includes a matrix 402. The horizontal direction of the matrix 402 is associated with multiple device roles, and the same device roles are identified in the vertical direction. The different device roles are defined in a legend 404. In this example, the device roles include Level 1 controllers, Level 1 third-party devices, Level 2 servers, Level 2 operator console stations, other Level 2 WINDOWS devices, and Level 3 WINDOWS devices. Note, however, that any other or additional device roles could be supported based on, for instance, end user needs or underlying control system architectures.

Each entry 406 in the matrix 402 is associated with a pair of device roles, one device role in the horizontal direction and one device role in the vertical direction. Each entry 406 in the matrix 402 also has a value that defines the communication policy to be applied to its associated pair of device roles. Each entry 406 can be assigned its value using any suitable technique, such as a drop-down menu 408. A legend 410 is provided to identify the different values that can be selected for inclusion in each entry 410 of the matrix 402. In this example, the possible values include:

N (no communication)—a pair of nodes having the associated pair of device roles cannot communicate.

A (authentication only)—a pair of nodes having the associated pair of device roles can communicate with authentication but not encryption, such as by using IPsec ESP with message authentication and null encryption.

C (cleartext)—a pair of nodes having the associated pair of device roles can communicate in cleartext without authentication or encryption.

E (encrypted and authenticated)—a pair of nodes having the associated pair of device roles can communicate with authentication and encryption, such as by using IPsec ESP with message authentication and AES encryption.

Using the interface 400, a user can quickly and easily define and modify the communication policies to be used between different types of devices in an industrial process control and automation system. More specifically, for each pair of device roles, the user can quickly and easily identify how communications are to occur between that pair of device roles. Information identifying the selected communication policies can be stored in the policy database 208.

Returning to FIG. 3, a policy decision point retrieves communication policy information from the policy database at step 306. This could include, for example, the PDP 206 retrieving information identifying the communication policies defined by the user from the policy database 208. The policy decision point generates one or more node policies (also known as access vectors) for various devices using the retrieved information at step 308. This could include, for example, the PDP 206 converting the communication policies into access vectors 232 for various devices. This can be done at runtime, meaning while the PDP 206 and the PEPs 202-204 and other devices are operating in the system 100 (rather than requiring the node policies to be generated before a PDP or PEP begins operation, although this could also be done).

The policy decision point receives a request for one or more node policies from a policy enforcement point at step 310. This could include, for example, the PDP 206 receiving a request for one or more access vectors 232 from a PEP 202-204. The policy decision point provides the requested node policy or policies to the policy enforcement point at step 312. This could include, for example, the PDP 206 providing the requested access vector(s) 232 to the PEP 202-204. The PDP 206 could provide a single access vector 232 involving the PEP 202-204 or multiple access vectors 232 involving the PEP 202-204. The number of access vectors 232 could depend, among other things, on how the access vectors 232 are defined and how many communication policies are defined for the PEP 202-204. Note that the receipt of the request for one or more node policies is optional and that other techniques could be used to provide node policies/access vectors to policy enforcement points. For instance, as described below, node policies (such as changed or new access vectors 232) could be pushed to affected policy enforcement points without waiting for requests from those policy enforcement points.

The policy enforcement point establishes one or more communication channels using the node policy or policies at step 314. This could include, for example, the PEP 202-204 establishing cleartext, authenticated but not encrypted, or authenticated and encrypted channels with another device, such as another PEP.

In general, IPsec policy functions allow new IPsec policies to be added and existing policies to be viewed, modified, or deleted. The PDP 206 supports various functions based on new or changed communication policies retrieved from the policy database 208. For example, an "add" function can accept as inputs a device identifier (ID) and a set of device IDs and supported communication methods. The "add" function operates to create IPsec policy records, such as by mapping the first device ID with all other device IDs and capturing the supported communication method to be used by the first device for each mapping. A "modify" function can accept as inputs a device ID and a communication method to be supported by the identified device, which allows the communication method for a given IPsec policy to be changed. A "delete" function can accept as an input an identifier for a set of one or more IPsec policies, which allows those IPsec policies to be deleted for a given device (indicating that the given device can no longer communicate with those devices whose policies have been deleted).

In some embodiments, an Access Vector Business Provider (AVBP) within the PDP 206 provides API functions that can be used to (i) generate per-role access vectors, (ii) generate subject-role assignment lists, and (iii) generate IPsec access vectors. For all of those functions, the AVBP can use an Access Vector Service Provider (AVSP) to access policies from the underlying database 208. The AVBP can also provide a function to generate IPsec access vectors, which can be generated by reviewing each device and, for each identified device, specifying other devices with which the identified device is allowed to communicate. The supported communication method (such as encrypted or plaintext) for each device-to-device connection can also be captured as part of the IPsec access vectors. Example API functions can include a function to generate all IPsec access vectors based on the policy database 208 and a function to generate one or more IPsec access vectors for one or more identified devices. The generated access vectors here could represent generic access vectors, and the PDP 206 can perform subsetting, interpretation, and distribution using the access vectors.

With respect to subsetting, an access vector generated by the PDP 206 from the database 208 may represent a complete policy. However, depending upon the network configuration and policies, the generated access vector could contain information that is not relevant to a particular device. For example, a specific controller 106 may be authorized to access only nodes having the "server" and "engineering workstation" roles. Thus, all of the access vector's information regarding devices in other roles, such as "operator workstation," can be irrelevant. In a similar manner, a PEP (such as PEP 202) may only be protecting a particular set of functions or devices, and devices or functions protected by other PEPs (such as PEP 204) may not be relevant to the PEP 202. In this case, information on devices associated with the PEP 204 may be removed from the access vector passed to the PEP 202. Subsetting removes this irrelevant information to reduce the memory size of the access vector being prepared for a specific device.

With respect to interpretation, the access vector generation technique described above may generate a generic access vector. However, the system 100 could support a wide range of devices running different operating systems and using potentially different versions of IPsec and IKE. As a result, an access vector can be interpreted or translated in the context of the target device. For example, if the target device is a WINDOWS workstation, the interpretation/translation may produce a group policy object.

Figure 5:
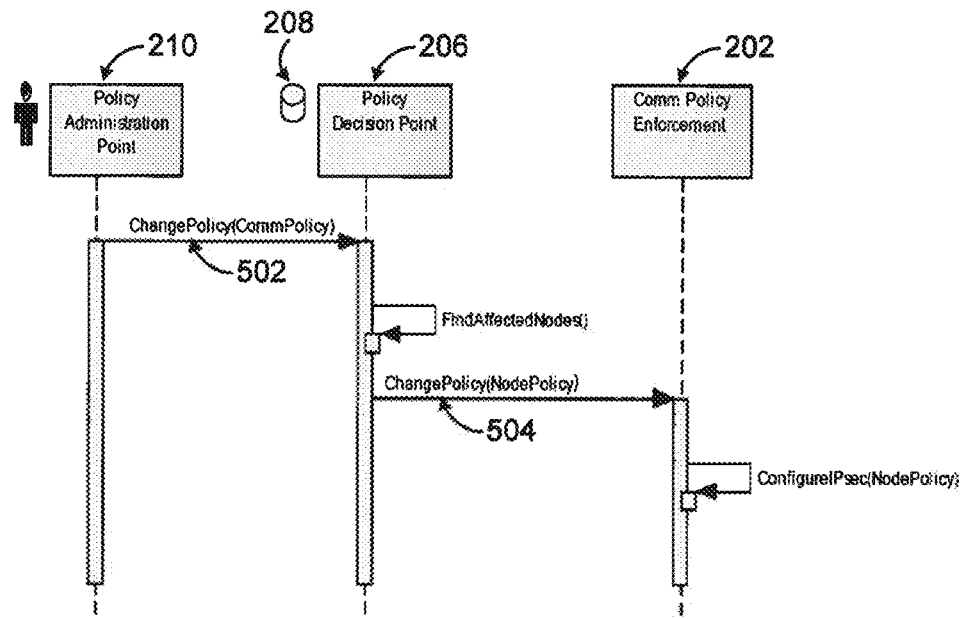

With respect to distribution, the PDP 206 distributes the finalized access vectors (access vectors 232) to the appropriate devices. For example, the system can use a "push" model where the PDP 206 pushes out new access vectors 232 to affected devices whenever there is a policy change. This approach is shown in FIG. 5, which illustrates an example signaling diagram 500 for providing an access vector 232 to update a secure communication policy. The signaling diagram 500 involves the use of the PDP 206, which extracts policy information from the policy database 208 and creates the access vectors 232 for distribution to end devices (including the PEPs 202-204). There may also be instances when a PEP 202-204 loses its access vectors (such as during a reboot). The PDP 206 could also support a "pull" model that allows a device to contact the PDP 206 and request a current set of access vectors 232.

As shown in FIG. 5, a new or changed communication policy is sent from the policy administration point 210 (via the policy database 208) as a policy change message 502 identifying the new or changed communication policy. The PDP 206 receives the message 502, identifies any devices affected by the new or changed communication policy, and sends a policy change message 504 to the affected nodes. Each policy change message 504 includes the node policy (access vector 232) for an affected node. In response to the message 504, each affected node adjusts its IPsec configuration in accordance with the new or changed policy.

Returning to FIG. 3, the policy decision point repeats various steps as needed when nodes or communication policies are added, modified, or deleted at step 316. This could include, for example, the PDP 206 creating, modifying, or deleting access vectors 232 as nodes are added, modified, or deleted in the system 100. This could also include the PDP 206 creating, modifying, or deleting access vectors 232 as communication policies are added, modified, or deleted in the system 100.

Figure 6:
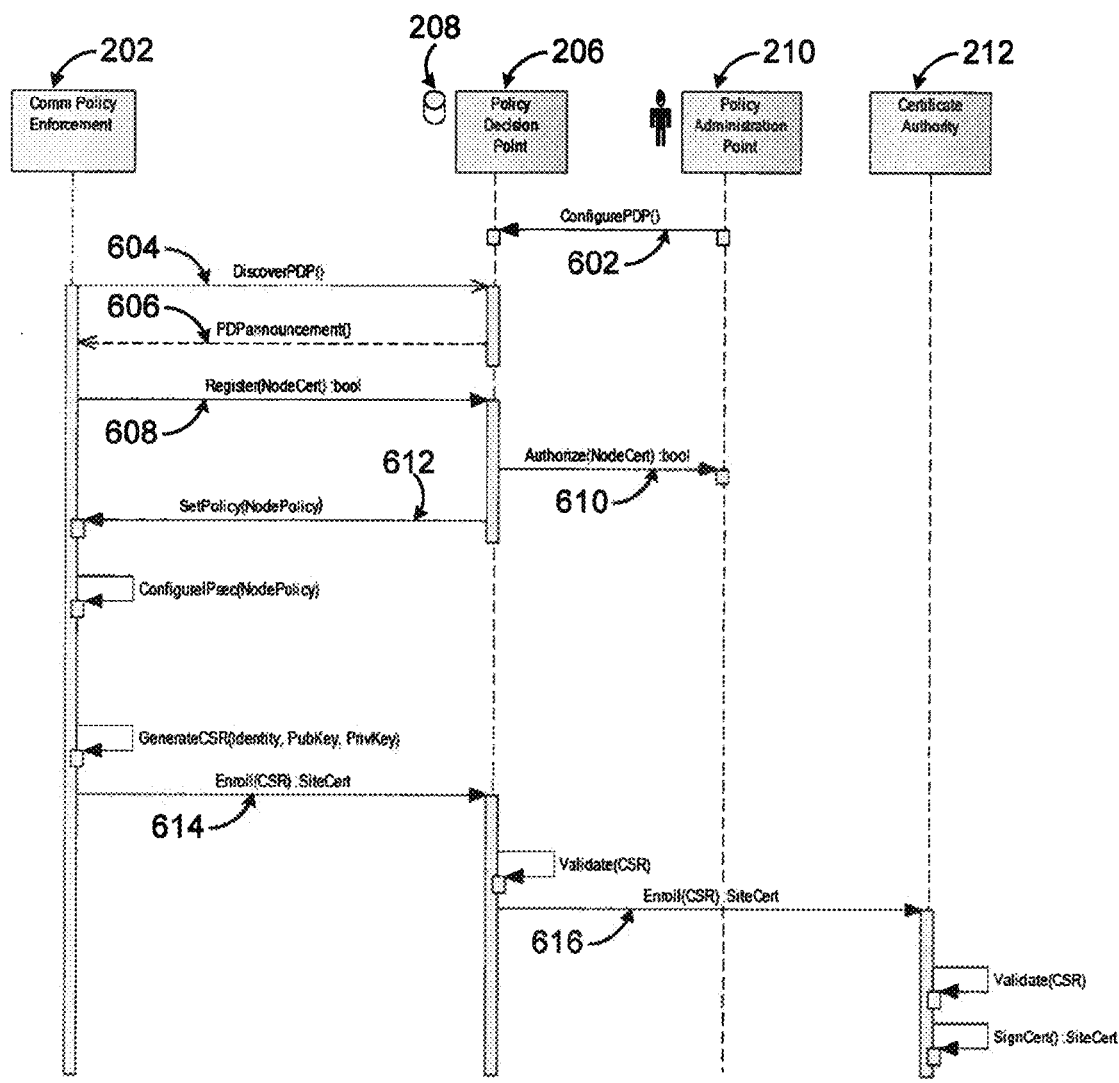

One example of this type of management is shown in FIG. 6, which illustrates an example signaling diagram 600 for adding a node (such as a PEP 202-204) to a secure system. The signaling diagram 600 here involves the use of the CA 212. Key management can be based upon a PKI and the X.509 v3 certificate model, and the CA 212 can sign X.509 certificates for devices joining the network.

Depending on the implementation, adding a node to a system can be completely automated or require some level of human interaction. In some embodiments, a new node is added to a system as follows. A PDP 206 can be initialized by sending a 'ConfigurePDP' message 602 from the policy administration point 210 to the PDP 206. The location of the PDP 206 is communicated to a device (PEP 202) joining the network, such as during its bootstrapping process. This can be done by sending a 'DiscoverPDP' message 604 from the PEP 202 to any PDPs and sending a 'PDPAnnouncement' message 606 from the PDP 206 to the PEP 202. This informs the PEP 202 of the presence of the PDP 206. This also includes sending a 'Register' message 608 from the PEP 202 to the PDP 206, sending an 'Authorize' message 610 from the PDP 206 to the policy administration point 210, and sending a 'SetPolicy' message 612 from the PDP 206 to the PEP 202. The messages 608-610 can include a digital certificate of the PEP 202 to aid in the identification and authentication of the PEP 202. In response to a node policy contained in the 'SetPolicy' message 612, the PEP 202 sets its IPsec configuration based on the received policy.

Once its IPsec connection is configured, the joining device can construct a join request that incorporates a Certificate Signing Request (CSR). The CSR can be protected with symmetric key encryption to avoid spoofing. The symmetric key is known to the PEP 202 and the PDP 206, and the symmetric key may not be communicated over the network. When the CMP protocol is used for certificate enrollment, this symmetric key is referred to as an Initial Authentication Key (IAK). The PEP 202 sends an 'Enroll' message 614 to the PDP 206 containing a generated site certificate, the PDP 206 validates the CSR and sends an 'Enroll' message 616 to the CA 212, and the CA 212 validates the CSR and signs the site certificate.

This system can be designed to support a wide range of devices, from WINDOWS workstations with rich user interfaces to low-cost controllers with a just few status light emitting diodes (LEDs). Thus, it may not be practical to have a one-size-fits-all approach to authenticating devices attempting to join the network. In some embodiments, the system can therefore support the following approaches for handling the CMP IAK:

Controllers that have an out-of band channel (such as a USB port) may receive the IAK through that channel. The IAK can be issued to the controller by the PDP 206 and may be completely hidden from a user.

Controllers that have a display but no out-of-band channel may automatically generate a random alphanumeric password that can be converted to the IAK using, for example, a Password-Based Key Derivation Function 2 (PBKDF2) function (such as in RFC2898). The password can be scanned or manually entered into the PDP 206 to authorize a device join.

Controllers that do not have a display or an out-of-band channel may come pre-programmed with an IAK/password from a vendor or manufacturer. For example, the IAK/password may be printed on the controller label. The IAK/password can be scanned or manually entered into the PDP 206 to authorize a device join.

As noted above, during the add process, human action may be needed to authorize a new device addition to a secure network. For example, a security administrator can review information provided in a CSR to validate a device identity and then enter a validation key to authorize a device join. From then on, no user interaction may be needed. The new device may request communication with any other authorized device in the system and communicate based on the communication policy configured for the network.

Figure 7:
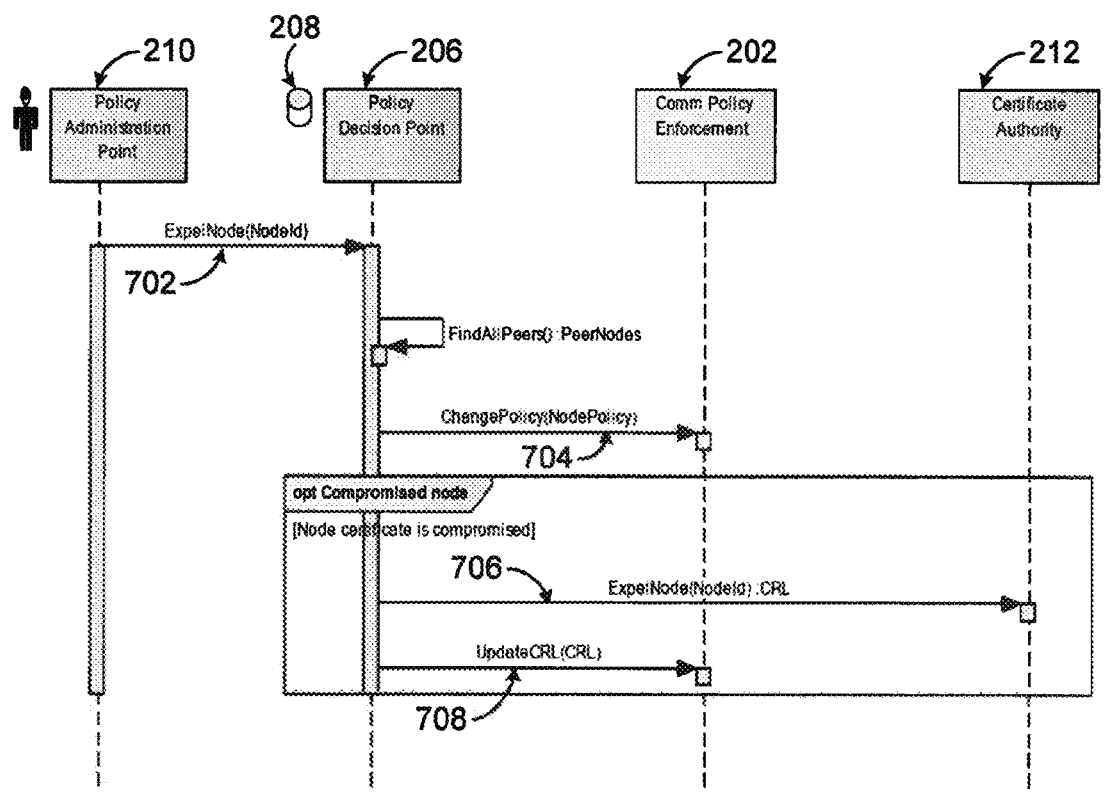

Another example of this type of management is shown in FIG. 7, which illustrates an example signaling diagram 700 for removing a node (such as a PEP 202-204) from a secure system. The signaling diagram 700 here involves the use of the CA 212. When a device is to be removed from the network, the PDP 206 can distribute access vectors 232 excluding the removed device from communications as shown in FIG. 7. This could include the policy administration point 210 sending an 'ExpelNode' message 702 to the PDP 206 with a node identifier identifying the device to be removed. The PDP 206 identifies any devices that communicate with the node being removed, and the PDP 206 sends a 'ChangePolicy' message 704 to any affected devices (such as the PEP 202). Optionally, if the node being removed was compromised (and thus its certificate is now compromised), this could also include the PDP 206 sending an 'ExpelNode' message 706 to the CA 212 and sending an 'UpdateCRL' message to the affected devices (such as the PEP 202). This can cause the PEP 202 and CA 212 to delete the removed node's certificate.

Figure 8:
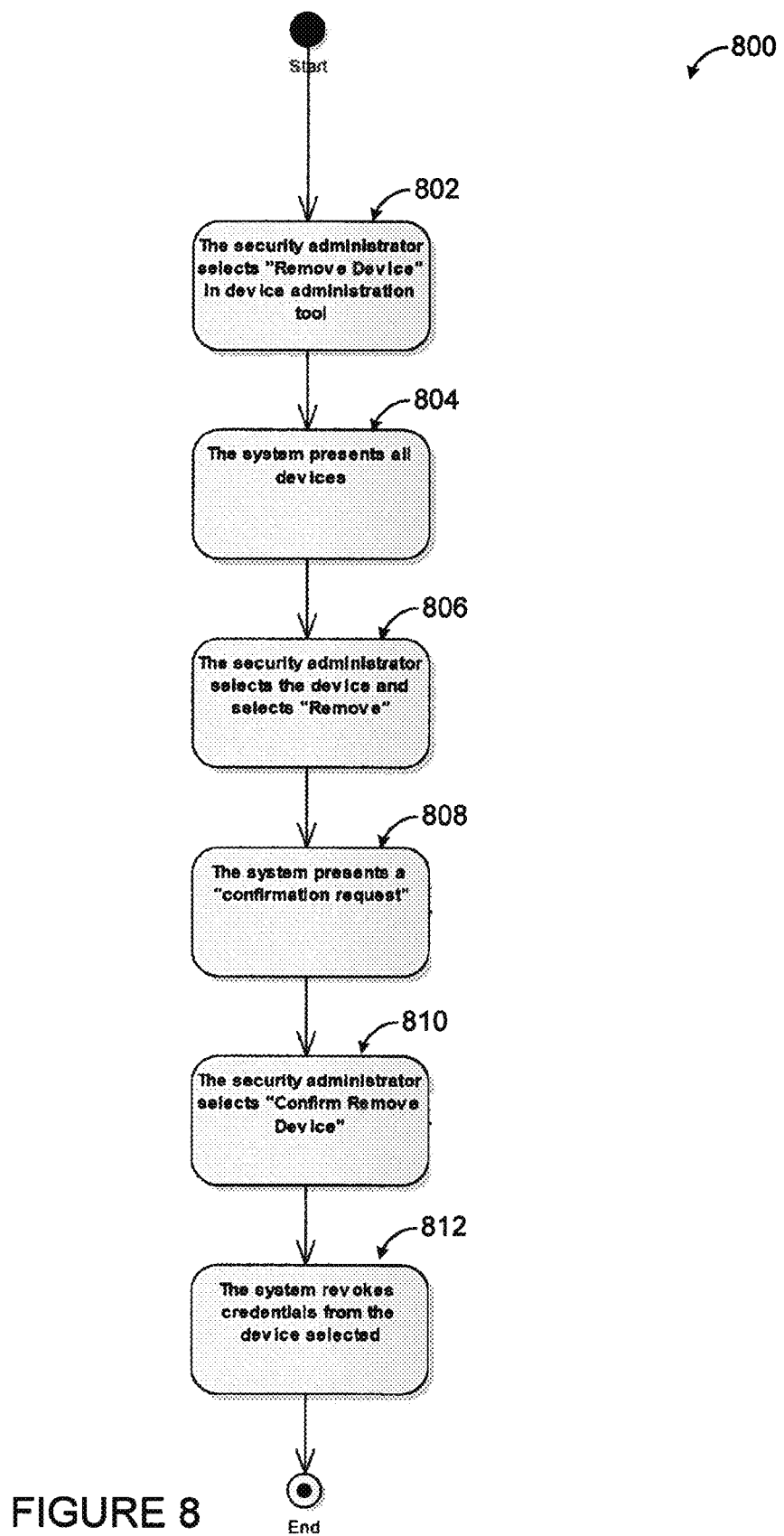

FIG. 8 illustrates an example method 800 supporting the removal of a node from a secure system. As shown in FIG. 8, a security administrator can select a "Remove a Device" option in a device administration tool at step 802, and a list of devices is shown to the security administrator at step 804. The security administrator selects the device to be removed at step 806, and the removal of the selected device is confirmed at step 808. After the security administrator confirms the removal at step 810, the system revokes the security credentials of the selected device at step 812 (which could be done as shown in FIG. 7).

Although FIGS. 3 through 8 illustrate one example of a method 300 for policy-based secure communication with automatic key management in an industrial process control and automation system and related details, various changes may be made to FIGS. 3 through 8. For example, while shown as a series of steps, various steps in FIG. 3 could overlap, occur in parallel, occur in a different order, or occur any number of times. Also, any other suitable mechanism could be used to define or control the communication policies to be used between different device roles. In addition, any other signaling could be used to support the functions described above.

Figure 9:
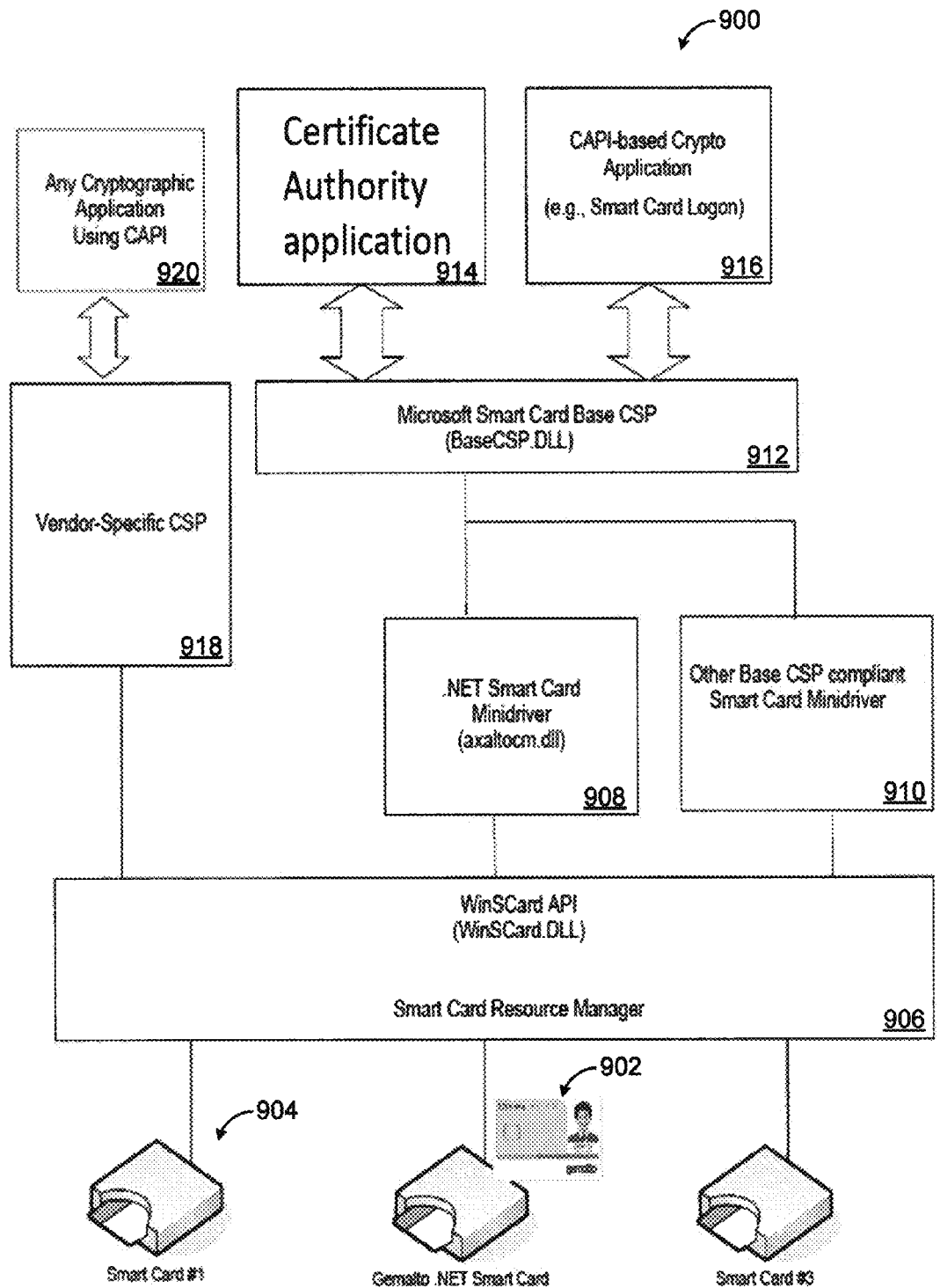
FIG. 9 illustrates an example mechanism for private key storage by a certificate authority according to this disclosure.

FIG. 9 illustrates an example mechanism 900 for private key storage by a CA 212 according to this disclosure. As noted above, the confidentiality of a CA's root private key can be protected by storing the key in a key store implemented on a smart card 902. Any suitable smart card 902 could be used, such as the GEMALTO IDPRIME.NET card, which provides the ability to perform cryptographic operations (including PKI CA operations) within a WINDOWS SERVER 2008 environment. The use of a smart card 902 makes it possible for an administrator to remove the smart card 902 and store it in a physically-protected location to provide additional security.

The mechanism 900 here includes one or more smart card readers 904 configured to read data from and provide data to the smart card 902. A smart card resource manager 906 controls interactions with the smart card reader(s) 904, and one or more drivers 908-910 support interactions between the resource manager 906 and a base cryptography technology 912. The base cryptography technology 912 performs cryptographic operations and allows data to be provided to and from a CA application 914 or a cryptographic API (CAPI)-based cryptographic application 916. A vendor-specific CSP 918 could also be used to support interactions with another CAPI-based cryptographic application 920.

Each smart card reader 904 includes any suitable structure for receiving and interacting with a smart card. The smart card resource manager 906 includes any suitable logic for controlling interactions with one or more smart card readers, such as the WINDOWS Smart Card (WinSCard) API supported by the WinSCard dynamic link library. Each driver 908-910 includes any suitable logic supporting the use of one or more smart card readers with a computing device, such as the MICROSOFT.NET Smart Card Minidriver supported by the axaltocm dynamic link library or other Base CSP-compliant Smart Card Minidriver. The base cryptography technology 912 includes any suitable logic supporting cryptographic operations, such as the MICROSOFT Base Smart Card CSP supported by the BaseCSP dynamic link library. The vendor-specific CSP 918 includes any suitable logic supporting cryptographic operations. The CA application 914, CAPI-based cryptographic application 916, and cryptographic application 920 denote any suitable logic that functions in conjunction with cryptographic operations, such as logic for creating, managing, and revoking digital certificates.

Although FIG. 9 illustrates one example of a mechanism 900 for private key storage by a CA 212, various changes may be made to FIG. 9. For example, any other suitable mechanism could be used to securely store the private key of a CA 212.

Figure 10:
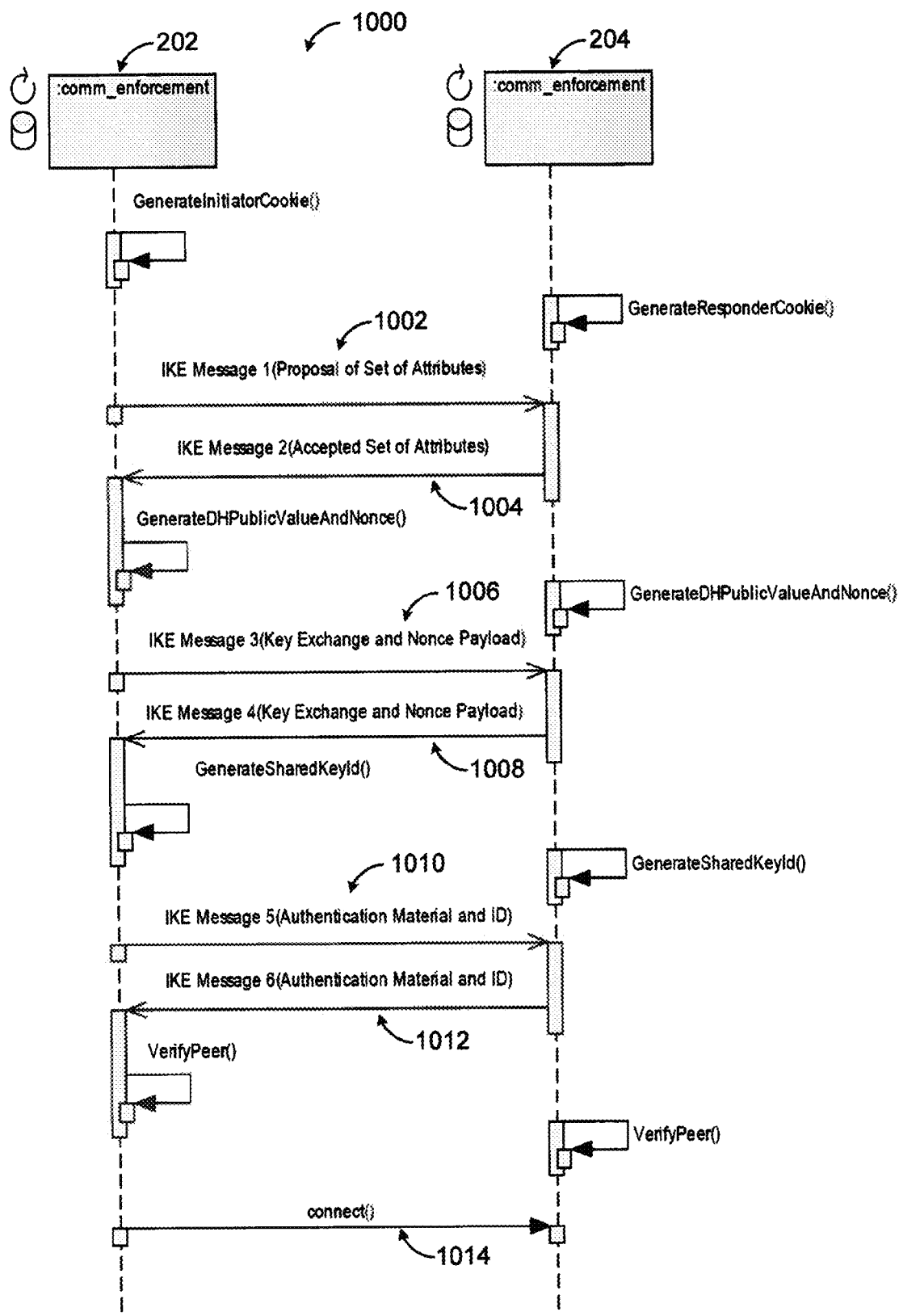
FIG. 10 illustrates an example technique for exchanging keys to establish node-to-node secure communications in an industrial process control and automation system according to this disclosure.

FIG. 10 illustrates an example technique 1000 for exchanging keys to establish node-to-node secure communications in an industrial process control and automation system according to this disclosure. As noted above, IKE can be used to establish IPsec security associations, and RFC4945 provides the complete specification for this approach. A typical IKE exchange is represented in FIG. 10, where two PEPs 202-204 initially generate their own cookies and then exchange a series of messages 1002-1012. This includes a message 1002 with a proposed set of attributes and a message 1004 with an accepted set of attributes. After each PEP 202-204 generates a Diffie Hellman (DH) pubic value and nonce, the PEPs 202-204 use the messages 1006-1008 to exchange keys and nonce payloads. After each PEP 202-204 generates a shared key, the PEPs 202-204 use the messages 1010-1012 to exchange authentication materials and identifiers. Each PEP 202-204 verifies its peer and applies the access vector associated with the peer role, and a secure connection 1014 is initiated.

Although FIG. 10 illustrates one example of a technique 1000 for exchanging keys to establish node-to-node secure communications in an industrial process control and automation system, various changes may be made to FIG. 10. For example, any other signaling could be used to support the functions described above.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
  defining multiple communication policies involving multiple device roles in an industrial process control and automation system based on user input, each communication policy defining communications allowed to occur between a pair of the device roles;
generating node policies using the communication policies, each node policy identifying communications allowed to occur to or from one of the device roles; and
providing at least one of the node policies to at least one of: a specified device in the industrial process control and automation system and one or more other devices in the industrial process control and automation system, the specified device having a specified one of the device roles;
wherein the at least one node policy is based on one or more of the communication policies defining communications allowed to occur to or from the specified device role of the specified device;
wherein the at least one node policy is provided to at least one of the specified device and the one or more other devices in order to control communications to or from the specified device; and
wherein defining the multiple communication policies comprises:
displaying a matrix identifying the device roles;
in response to receiving a first value indicating nodes having an associated pair of device roles cannot communicate with one another, identifying that the nodes of the associated pair of device roles cannot communicate with one another in the matrix;
in response to receiving a second value indicating the nodes having the associated pair of device roles communicate with authentication and with encryption, identifying that the nodes of the associated pair of device roles communicate with authentication and with encryption in the matrix;
in response to receiving a third value indicating the nodes having the associated pair of device roles communicate in cleartext without authentication and without encryption, identifying that the nodes of the associated pair of device roles communicate in cleartext without authentication and without encryption in the matrix; and
in response to receiving a fourth value indicating the nodes having the associated pair of device roles communicate with authentication and without encryption, identifying that the nodes of the associated pair of device roles communicate with authentication and without encryption in the matrix.

2. The method of claim 1, wherein providing the at least one node policy comprises:
providing, to the specified device, at least one first node policy identifying allowable communications between the specified device and the one or more other devices; and
providing, to the other devices, at least one second node policy identifying allowable communications between the one or more other devices and the specified device.

3. The method of claim 1, wherein the communication policies define allowable communications between all devices having the device roles in the industrial process control and automation system.

4. The method of claim 1, further comprising:
updating the at least one node policy in response to at least one of: (i) an addition, modification, or removal of a device in the industrial process control and automation system and (ii) an addition, modification, or deletion of a communication policy.

5. The method of claim 1, wherein generating and providing the at least one node policy are done in response to authenticating the specified device.

6. The method of claim 5, wherein authenticating the specified device comprises one of:
receiving an initial authentication key from the specified device in an out-of-band channel of the specified device;
receiving a password presented by the specified device and converting the password into the initial authentication key for the specified device; and
receiving the initial authentication key or password pre-programmed into the specified device.

7. The method of claim 1, wherein the specified device in the industrial process control and automation system is a different type of device from the one or more other devices in the industrial process control and automation system.

8. An apparatus comprising:
at least one processing device configured to:
define multiple communication policies involving multiple device roles in an industrial process control and automation system based on user input, each communication policy defining communications allowed to occur between a pair of the device roles;
generate node policies using the communication policies, each node policy identifying communications allowed to occur to or from one of the device roles; and
initiate communication of at least one of the node policies to at least one of: a specified device in the industrial process control and automation system that has a specified one of the device roles and one or more other devices in the industrial process control and automation system, wherein the at least one node policy is based on one or more of the communication policies defining communications allowed to occur to or from the specified device role of the specified device; and
an interface configured to provide the at least one node policy to at least one of the specified device and the one or more other devices in order to control communications to or from the specified device;
wherein, to define the multiple communication policies, the at least one processing device is configured to:
initiate display of a matrix identifying the device roles;
in response to receiving a first value indicating nodes having an associated pair of device roles cannot communicate with one another, identify that the nodes of the associated pair of device roles cannot communicate with one another in the matrix;
in response to receiving a second value indicating the nodes having the associated pair of device roles communicate with authentication and with encryption, identify that the nodes of the associated pair of device roles communicate with authentication and with encryption in the matrix;
in response to receiving a third value indicating the nodes having the associated pair of device roles communicate in cleartext without authentication and without encryption, identify that the nodes of the associated pair of device roles communicate in cleartext without authentication and without encryption in the matrix; and
in response to receiving a fourth value indicating the nodes having the associated pair of device roles communicate with authentication and without encryption, identify that the nodes of the associated pair of device roles communicate with authentication and without encryption in the matrix.

9. The apparatus of claim 8, wherein the at least one processing device is configured to:
  initiate communication, to the specified device, of at least one first node policy identifying allowable communications between the specified device and the one or more other devices; and
  initiate communication, to the other devices, of at least one second node policy identifying allowable communications between the one or more other devices and the specified device.

10. The apparatus of claim 8, wherein the at least one processing device is further configured to:
  remove irrelevant information from each node policy; and
  interpret or translate each node policy based on the device to receive that node policy.

11. The apparatus of claim 8, wherein the at least one processing device is further configured to update the at least one node policy in response to at least one of: (i) an addition, modification, or removal of a device in the industrial process control and automation system and (ii) an addition, modification, or deletion of a communication policy.

12. The apparatus of claim 8, wherein the at least one processing device is configured to generate and provide the at least one node policy in response to authenticating the specified device.

13. The apparatus of claim 12, wherein, to authenticate the specified device, the at least one processing device is configured to:
  receiving an initial authentication key from the specified device in an out-of-band channel of the specified device;
  receiving a password presented by the specified device and converting the password into the initial authentication key for the specified device; and
  receiving the initial authentication key or password preprogrammed into the specified device.

14. The apparatus of claim 8, wherein the specified device in the industrial process control and automation system is a different type of device from the one or more other devices in the industrial process control and automation system.

15. A non-transitory computer readable medium embodying a computer program, the computer program comprising computer readable program code for:
  defining multiple communication policies involving multiple device roles in an industrial process control and automation system based on user input, each communication policy defining communications allowed to occur between a pair of the device roles;
  generating node policies using the communication policies, each node policy identifying communications allowed to occur to or from one of the device roles; and
  providing at least one of the node policies to at least one of: a specified device in the industrial process control and automation system that has a specified one of the device roles and one or more other devices in the industrial process control and automation system;
  wherein the at least one node policy is based on one or more of the communication policies defining communications allowed to occur to or from the specified device role of the specified device in order to control communications to or from the specified device; and
  wherein the computer readable program code for defining the multiple communication policies comprises computer readable program code for:
    displaying a matrix identifying the device roles;
    in response to receiving a first value indicating nodes having an associated pair of device roles cannot communicate with one another, identifying that the nodes of the associated pair of device roles cannot communicate with one another in the matrix;
    in response to receiving a second value indicating the nodes having the associated pair of device roles communicate with authentication and with encryption, identifying that the nodes of the associated pair of device roles communicate with authentication and with encryption in the matrix;
    in response to receiving a third value indicating the nodes having the associated pair of device roles communicate in cleartext without authentication and without encryption, identifying that the nodes of the associated pair of device roles communicate in cleartext without authentication and without encryption in the matrix; and
    in response to receiving a fourth value indicating the nodes having the associated pair of device roles communicate with authentication and without encryption, identifying that the nodes of the associated pair of device roles communicate with authentication and without encryption in the matrix.

16. The computer readable medium of claim 15, wherein the computer readable program code for providing the at least one node policy comprises computer readable program code for:
  providing, to the specified device, at least one first node policy identifying allowable communications between the specified device and the one or more other devices; and
  providing, to the other devices, at least one second node policy identifying allowable communications between the one or more other devices and the specified device.

17. The computer readable medium of claim 15, wherein the computer program further comprises computer readable program code for:
  removing irrelevant information from each node policy; and
  interpreting or translating each node policy based on the device to receive that node policy.

18. The computer readable medium of claim 15, wherein the computer program further comprises computer readable program code for updating the at least one node policy in response to at least one of: (i) an addition, modification, or removal of a device in the industrial process control and automation system and (ii) an addition, modification, or deletion of a communication policy.

19. The computer readable medium of claim 15, wherein the computer readable program code for generating and providing the at least one node policy comprises computer readable program code for generating and providing the at least one node policy in response to authenticating the specified device.

20. The computer readable medium of claim 15, wherein the specified device in the industrial process control and automation system is a different type of device from the one or more other devices in the industrial process control and automation system.

* * * * *